United States Patent [19]

Dravnieks

[11] 4,255,171
[45] Mar. 10, 1981

[54] HEAT TRANSFER MEDIUM FOR ROTARY HEAT TRANSFERRERS

[75] Inventor: Konstantins Dravnieks, Thiensville, Wis.

[73] Assignee: Wehr Corporation, Milwaukee, Wis.

[21] Appl. No.: 934,463

[22] Filed: Aug. 17, 1978

[51] Int. Cl.³ .................... B01D 53/08; B01D 53/26; B32B 3/28

[52] U.S. Cl. .................... 55/269; 55/390; 156/210; 156/264; 156/292; 156/335; 427/289; 427/391; 427/401; 428/174; 428/182; 428/184; 428/186; 428/530; 165/8

[58] Field of Search ............... 428/186, 174, 530, 182, 428/184; 165/8–10, 177; 55/390, 269, 387; 156/210, 264, 335, 278, 292; 427/372, 289, 401

[56] References Cited

U.S. PATENT DOCUMENTS

| | | | |
|---|---|---|---|
| 3,265,550 | 8/1966 | Lindqvist | 156/210 |
| 3,733,791 | 5/1973 | Dravnieks | 55/390 |
| 3,789,916 | 2/1974 | Lindahl | 55/390 |
| 4,021,282 | 5/1977 | Norback | 156/210 |
| 4,093,435 | 6/1978 | Marron et al. | 55/390 |

*Primary Examiner*—Paul J. Thibodeau
*Attorney, Agent, or Firm*—Michael, Best & Friedrich

[57] ABSTRACT

The heat transfer medium for rotary air-to-air heat transferrers includes alternate planar and corrugated layers of a fiber-reinforced, heat-curable, organic resinous material. After corrugating and interleaving of the layers, the resultant structure is heated to cure the resin to a hardened state and the layers are bonded together at their points of contact to form a self-supporting, water-proof structure including a plurality of uniformly-spaced, tubular flow passages extending axially through the structure in parallel relationship parallel to the rotational axis of the transferrer. The surfaces of the flow passages exposed to air flow are coated with an aqueous coating solution containing a water-soluble hygroscropic material, such as lithium chloride, and a sufficient amount of a water-soluble wetting agent to provide a continuous film of the coating solution on these surfaces.

16 Claims, 5 Drawing Figures und 4,255,171

HEAT TRANSFER MEDIUM FOR ROTARY HEAT TRANSFERRERS

BACKGROUND OF THE INVENTION

This invention relates generally to rotary air-to-air transferrers for air conditioning systems and, more particularly, to heat transfer media employed in such heat transferrers.

Rotary air-to-air heat transferrers are well-known in the air conditioning art. They are used in air conditioning systems to remove a portion of the heat from one air stream, such as from the exhaust stream from a heating system, and transfer the same to another air stream, such as the inlet stream to the system. The total energy requirements for heating or cooling buildings are thereby reduced; hence, intitial equipment and operating costs can also be reduced. The primary component of such a heat transferrer is a slowly rotating, open cylinder, commonly called a wheel, through which both incoming and outgoing air streams are passed. This wheel carries an air-permeable material as the heat transfer medium.

One type of heat transfer medium consists of sheets or layers of fibrous, liquid-absorbent material, such as asbestos paper, with alternate sheets or layers being flat or planar and every other layer or sheet being undulating or corrugated. If it is desired to transfer moisture from one stream to the other, the medium typically is impregnated with a desiccant substance such as silica gel or a hygroscopic salt such as lithium chloride.

Examples of this type of heat transfer medium are disclosed in U.S. Pat. Nos. 2,818,934, 3,155,153, 3,307,617 and 3,377,225. U.S. Pat. Nos. 3,176,446 and 3,733,791 disclose other types of substrates for supporting desiccant or hygroscopic materials.

The specific media disclosed in these patents are for the most part quite acceptable for many applications. However, with decreasing availability and rising cost of fuel, there is need for less costly, high efficiency heat transfer medium capable of recovering a higher amount of the thermal energy from an exhaust system.

One of the principal objects of this invention is to provide a relatively inexpensive heat transfer medium for rotary air-to-air heat transferrers employed in air conditioning systems and a method for making same.

Another of the principal objects of this invention is to provide such a heat transfer medium having an improved capability of transferring latent heat.

A further of the principal objects of this invention is to provide a heat transfer medium in which the exposed surfaces of the flow passages are coated with a film of a hygroscopic material in a manner whereby the amount of material available for surface contact by air flowing through the flow passages is maximized.

Other objects, aspects and advantages of the invention will become apparent to those skilled in the art upon reviewing the following detailed description, the drawing and the appended claims.

The heat transfer medium provided by this invention includes alternate flat or planar layers and undulating or corrugated layers of fiber-reinforced, heat-curable, organic, resinous material disposed in parallel relationship. The layers are bonded together at their points of contact to form a self-supporting, water-proof structure including uniformly-spaced, tubular flow channels or passages extending axially from one side to the other in parallel relationship to each other and parallel to the rotational axis of the heat transferrer. The portions of the layers defining the flow passages are substantially non-absorbent relative to water. The surfaces of the flow passages exposed to air flow are coated with a film applied as an aqueous coating solution containing a water-soluble, hygroscopic material for exchanging moisture with air flowing in contact therewith and a sufficient amount of a water-soluble wetting agent to provide a continuous film of the coating solution on the flow passage surfaces.

In a preferred embodiment, the layers are formed from thin sheets of a fibrous material, such as kraft paper, impregnated with at least 50 weight % of a heat-curable organic resin, such as a phenolic or a melamine resin, which is partially cured (B-stage). After corrugating and interleaving, the resultant structure is heated to cure the resin to a hardened state.

The heat transfer medium can be made into wedge-shaped units with the planar and corrugated layers extending either generally radially, through concentric arcs, or through chords relative to the rotational axis of the transferrer.

DESCRIPTION OF THE PREFERRED EMBODIMENTS

Figure 1:
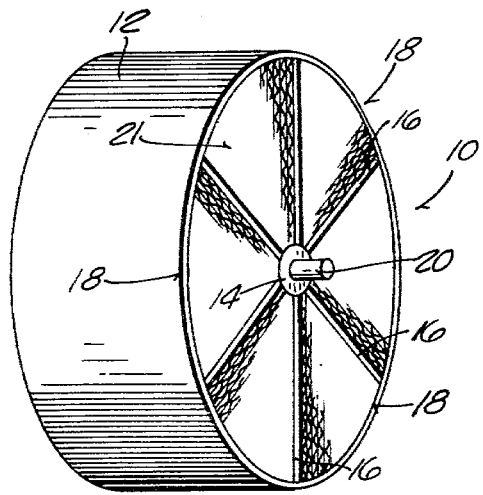
FIG. 1 is a perspective view of a rotary air-to-air heat transferrer employing heat transfer medium in accordance with this invention.

Illustrated in FIG. 1 is a wheel assembly 10 for a rotary air-to-air heat transferrer. The wheel assembly 10 includes a cylindrical outer casing 12, a central hub 14, a plurality of generally imperforate blades 16 extending radially outwardly from the hub 14 and dividing the casing 12 into a plurality of pie- or wedge-shaped sectors or compartments 18, and an axle 20 for rotatably supporting the wheel assembly 10 within a housing or duct (not shown) which is separated into an inlet flow passage and an exhaust flow passage in the usual manner. Disposed in each compartment 18 and adhesively bonded to at least one of the corresponding blades 16 is a heat transfer unit 21 consisting of a wedge-shaped segment of heat transfer medium 22.

The heat transfer medium 22 is made from a fiber-reinforced, organic resinous material and includes flat or planar sheets or layers 24 of the material alternating with undulating or corrugated layer 26 of the material having the same thickness. Various suitable fiber-reinforced resinous materials which are water-proof and have sufficient structural integrity to withstand the operating environment can be used. In the specific embodiment illustrated, the layers 24 and 26 are made from sheets of a fibrous material substantially saturated with a partially cured, heat-curable resin. The fibrous cellulosic material serves as a carrier for the resin and facilitates formation of the resin into a corrugated structure.

Representative suitable fibrous materials for this purpose include kraft paper, nylon fiber paper, mineral fiber paper and the like. Kraft paper presently is preferred because of its lower cost.

The sheets of fibrous material are impregnated with at least 50 weight %, and up to 80 weight % or more, of a heat-curable, moisture-resistant, organic resin which can be cured at temperatures below a level at which the fibrous material can be damaged. Suitable organic resinous materials for this purpose include phenolic type resins (particularly phenolic aldehyde resins) melamines, polyesters and the like which, upon curing, serve to effectively weld or bond the planar layers 24 and the corrugated layers 26 together at their points of contact. To facilitate assembly of the layers 24 and 26 into a green or uncured corrugated structure which can be converted to a unitary, self-supporting structure by simply heating to an elevated temperature, the fibrous material preferably is impregnated with the resin in a partially cured or B-stage form.

Figure 2:
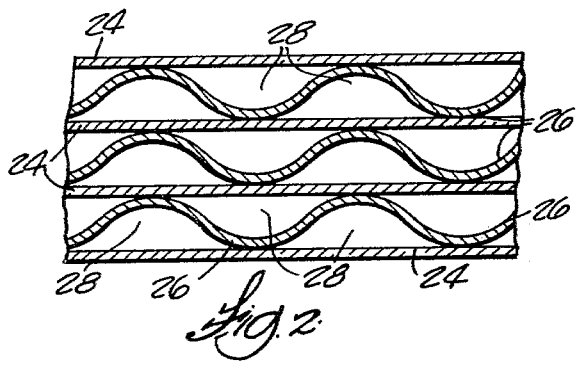
FIG. 2 is an enlarged, fragmentary view of the heat medium in the transferrer illustrated in FIG. 1.

After being impregnated with the heat curable resin, the layers 26, which are originally flat, are corrugated and interleaved with the planar layers 24 in conventional corrugating apparatus. The assembled layers, which are disposed in a parallel relationship to each other as illustrated in FIG. 2, define a plurality of uniformly spaced, tubular flow channels or passages 28 which extend axially from one side of the structure to the other in parallel relationship to each other and parallel to the rotational axis of the wheel assembly 10. This arrangement minimizes pressure losses through the heat transfer medium and provides large available surface area for contact by air flowing through the flow passages 28.

The planar and corrugated layers 24 and 26 are built up into a block 30 (FIG. 3) which is then heated, while pressure is being applied at right angles to the corrugations, to an elevated temperature at a level high enough to cure the resin impregnate but low enough to prevent damage to the fibrous material of the layers 24 and 26. During heating, the resin softens and, upon curing to the hardened state, forms a strong bond between the layers 24 and 26 at their points of contact and the resultant corrugated structure is self-supporting and waterproof. The portions of the layers 24 and 26 defining the flow passages 28 are substantially non-absorbent with respect to water.

The block 30 can be formed into wedge-shaped segments having the final dimensions desired for a single heat transfer unit 21 during build up or made into larger assemblies from which two or more heat transfer units 21 can be suitably segregated.

In a preferred method of fabrication, sheets of kraft paper impregnated with about 50 weight % of a B-stage phenolic aldehyde resin are used for the corrugated layers 26 and the planar layers 24. The sheets for corrugated layers 26 are formed into corrugations which are approximately 0.06–0.08 inches high and are on 0.10–0.17 inch centers and the resulting corrugated sheets are interleaved with the planar sheets in a conventional manner to form a generally rectangular block 30 which is large enough for two or more heat transfer units 21.

Figure 3:
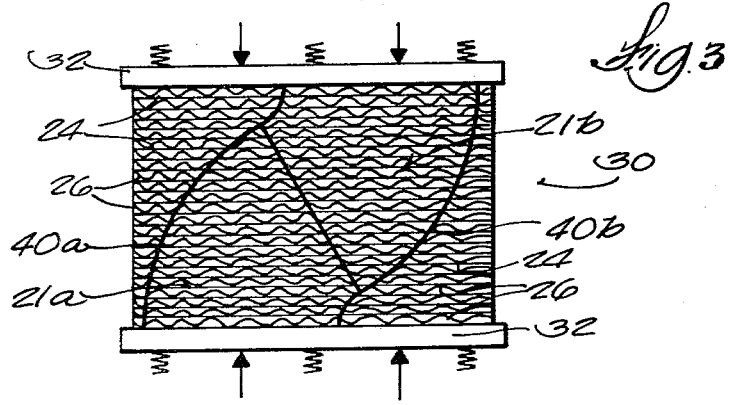
FIG. 3 is a side elevational view of a built-up block of cellulosic material from which two wedge-shaped heat transfer units are cut as shown by the solid lines.

Referring to FIG. 3, the block 30 is placed between a pair of spring-loaded members 32 which apply pressure on the block 30 at right angles to the corrugations. The block 30 is placed in an oven and heated to a temperature of about 280°–320° F. for approximately 1–4 hours to cure the resin impregnate to A-stage or a hardened state. After cooling heat transfer units 21a and 21b are cut from the block 30 with a power saw. The pattern for the saw cuts is represented by dark solid lines 40a and 40b in FIG. 3.

An aqueous solution containing a water-soluble, hygroscopic material capable of absorbing water from air and a water-soluble, wetting agent is applied to the heat medium 22 for each transfer unit 21, either prior to or after installation of the heat transfer unit into the casing 12, in a suitable manner whereby the surfaces of the flow passages 28 exposed to air flowing therethrough are coated with a film of the hygroscopic material.

Representative examples of suitable hygroscopic materials include lithium chloride, lithium bromide, magnesium chloride, calcium chloride, calcium bromide, zinc chloride, magnesium fluoride, aluminum fluoride, potassium acetate, potassium carbonate, potassium metaphosphate, magnesium perchlorate, phosphorous pentoxide, hafnium tetrachlorides, ethyl glycol and glycerine. At present, lithium chloride is the preferred hygroscopic material.

The concentration of the hygroscopic material in the coating solution is not particularly critical because the resultant film of hygroscopic material on the heat transfer medium is somewhat self-adjusting, i.e., it rapidly reaches an equilibrium within a relatively wide range of temperature and humidity conditions by either absorbing moisture from or releasing moisture to an air stream flowing in contact therewith. Generally, the concentration of the hygroscopic material is about 15 to 20.

As mentioned above, the interior surfaces of the flow passages 28 are substantially non-absorbent. Accordingly, a sufficient amount of suitable water-soluble wetting agent is added to the coating solution to insure that a continuous film of the coating solution covers the interior surfaces of the flow passages 28. Various conventional water-soluble wetting agents which are compatible with the particular hygroscopic material in the coating solution can be used. For example, Triton X-100, a surfactant supplied by Rohm and Haas Company, can be used in a coating solution containing lithium chloride as a hygroscopic material. Generally, the concentration of the wetting agent in the coating solution can be about 0.01 to about 0.1 weight %, with a concentration of about 0.02 weight % being preferred.

The coating solution can be applied to the heat transfer medium 22 in any suitable manner whereby a continuous film of the coating solution is provided over the interior surfaces of the flow passages 28, such as by dipping the heat transfer units 21 into a bath of the coating solution prior to installation in the casing 12 and pouring or spraying the coating solution onto the heat transfer medium 22 after installation of the units. Preferably, the heat transfer units 21 are installed into compartments 18 by bonding to at least one of the respective blades 18 with a suitable adhesive. The coating solution is then flooded throughout the heat medium 22 and a relatively low pressure air purge is then passed through the flow passages 28 to remove any excess coating solution.

Since the surface of the flow passages 28 are substantially non-absorbent, substantially all of the hygroscopic material, which is more or less absorbed on these surfaces as an overlay, is available for surface contact by air flowing through the flow passages. In prior art heat transfer media employing highly-absorbent asbestos paper or the like, an appreciable portion of the hygroscopic material is disposed in the pores of the paper and, thus, is not available for surface contact with the air streams. Accordingly, the heat transfer medium of the invention is more active than such prior art media, i.e., is capable of more rapidly exchanging moisture, and, therefore, is capable of more rapidly extracting a larger amount of latent heat from air streams of an air-conditioning system (either heating or cooling).

In the embodiment illustrated in FIGS. 1-3, both the planar layers 24 and the corrugated layers 26 in the heat transfer media 22 extend in a generally straight line, either generally radially relative to the casing 12 as illustrated in FIG. 1 or as a chord of an arc relative to the center of the casing 12 or the rotational axis of the wheel 10.

Figure 4:
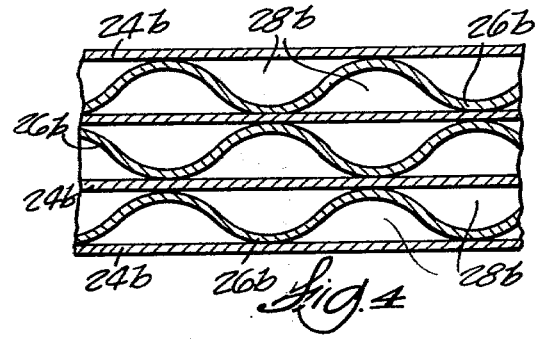

In the alternate embodiment illustrated in FIG. 4, the corrugations of the layers 26b in the heat transfer medium 22b are staggered to improve the structural integrity and the planar and corrugated layers 24b and 26b extend in a generally straight line similar to the embodiment illustrated in FIGS. 1-3.

Figure 5:
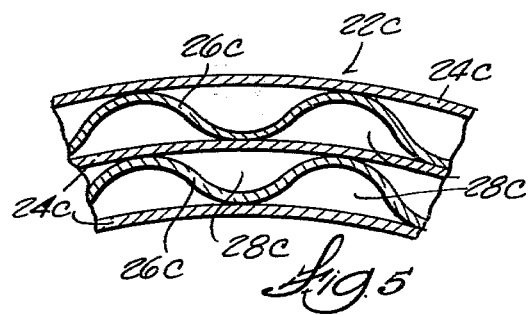
FIGS. 4 and 5 are enlarged, fragmentary views of alternate arrangement for the heat transfer medium.

In the alternate embodiment illustrated in FIG. 5, the planar and corrugated layers 24c and 26c in the heat transfer medium 22c extend through concentric arcs relative to the center of the casing 12 or rotational axis of the wheel 10.

The corrugated layers are illustrated as being substantially sinusoidal in FIGS. 2, 4 and 5. In actual practice, they are more triangular, i.e., have straight sides with radiuses at the points of contact with the planar layers. Also, rather than the corrugations being aligned as shown for the purpose of illustration, it is usually more practical for them to be randomly located for ease of production. The specific location and configuration of the corrugations does not appreciably affect the thermal energy transfer characteristics of the medium.

From the foregoing description, it can be seen that the heat transfer medium of this invention, while constructed from inexpensive materials in a simplified method, is highly active from the standpoint of transferring latent heat between streams of air flowing therethrough. Those skilled in the art can easily ascertain the essential characteristics of this invention, and without departing from the spirit and scope thereof, can make various exchanges and modifications to adapt it to various usages and conditions.

I claim:

1. A heat transfer medium for a rotary air-to-air heat transferrer comprising
   alternate planar and corrugated layers of a thin, fiber-reinforced, heat-curable, organic resinous material containing at least 50 weight % of the organic resin and bonded together at their points of contact to form a self-supporting, water-proof structure including uniformly-spaced, tubular flow passages extending axially from one side of the structure to the other in parallel relationship to each other and parallel to the rotational axis of said transferrer, the portions of said layers defining said flow passages being substantially non-absorbent relative to water; and
   a film coating the surfaces of said flow passages exposed to air flow, said film being applied as an aqueous coating solution containing a water-soluble, hygroscopic material for exchanging moisture with air flowing in contact therewith and a sufficient amount of a water-soluble, wetting agent to provide a continuous film of said coating solution on said surfaces.

2. A heat transfer medium according to claim 1 wherein said fiber-reinforced resinous material comprises sheets of a fibrous material substantially saturated with a heat-curable organic resinous material.

3. A heat transfer medium according to claim 2 wherein said heat curable material is a phenolic resin or a melamine resin partially cured prior to assembly of said layers and subsequently cured to a hardened state to form said structure.

4. A heat transfer medium according to claim 3 wherein said fibrous material is kraft paper.

5. A heat transfer medium according to claim 4 wherein the hygroscopic material is lithium chloride.

6. A heat transfer medium according to claim 5 wherein said coating solution contains about 15 to 20 weight % of lithium chloride.

7. A heat transfer medium according to claim 5 wherein said coating solution contains about 0.01 to about 0.1 weight % of the wetting agent.

8. A heat transfer medium according to claim 1 wherein said structure has a wedge-shape.

9. A heat transfer medium according to claim 8 wherein said planar and corrugated layers extend generally radially relative to the rotational axis of said transferrer.

10. A heat transfer medium according to claim 8 wherein said planar and corrugated layers extend as a chord relative to the rotational axis of said transferrer.

11. A heat transfer medium according to claim 8 wherein said planar and corrugated layers extend through concentric arcs relative to the rotational axis of said transferrer.

12. A rotatable heat exchanger wheel comprising a cylindrical, open-ended casing supported for rotation,
    a plurality of wedge-shaped segments of heat exchange medium disposed in and carried by said casing, said heat exchange medium comprising
    alternate planar and corrugated layers of a thin, fiber-reinforced, heat-curable, organic resinous material containing at least 50 weight % of the organic resin and bonded together at their points of contact to form a self-supporting, water-proof structure including uniformly-spaced, tubular flow passages extending axially from one side of the structure to the other in parallel relationship to each other and parallel to the rotational axis of said casing, the portions of said structure defining said flow passages being substantially non-absorbent relative to water, said fiber-reinforced, resinous material comprising sheets of a fibrous material substantially saturated with a phenolic or a melamine resin; and
    a film coating the surface of said flow passages exposed to air flow, said film being applied as an aqueous coating solution containing about 15-20 weight % of lithium chloride and a sufficient amount of a water-soluble, wetting agent to provide a continuous film of said solution on said surfaces.

13. A heat exchanger wheel according to claim 12 wherein said fibrous material is kraft paper.

14. A method for making a heat transfer medium adapted for use in a rotary air-to-air heat transferrer comprising the step of
    impregnating thin sheets of a fibrous material with at least 50 weight % of a heat-curable, organic resin;
    corrugating some of the resin-impregnated sheets and leaving others planar;

interleaving alternate planar and corrugated resin-impregnated sheets;

compressing the interleaved sheets together to form a corrugated structure;

heating the corrugated structure, while maintaining pressure thereon, to an elevated temperature to cure the resin impregnate to a hardened state and thereby form a self-supporting, water-proof structure including a plurality of uniformly-spaced, tubular flow passages having interior surfaces which are substantially non-absorbent relative to water; and coating the interior surfaces of the flow passages with an aqueous coating solution containing a water-soluble hygroscopic material for exchanging moisture flowing in contact therewith and a sufficient amount of a water-soluble wetting agent to provide a continuous film of the coating solution on the flow passage surfaces.

15. A method according to claim 14 wherein the resin is partially cured (B-stage) phenolic or melamine resin and the hygroscopic material is lithium chloride.

16. A method according to claim 15 wherein said corrugated structure is generally rectangular and a plurality of wedge-shaped segments are cut therefrom for installation into a circular heat transferrer.

* * * * *